(12) United States Patent  
Baeuerle

(10) Patent No.: US 6,684,152 B2  
(45) Date of Patent: Jan. 27, 2004

(54) METHOD OF INITIALIZING A SYSTEM FOR OPEN/CLOSED-LOOP CONTROL OF THE OPERATIONAL SEQUENCES OF A MOTOR VEHICLE AND A SYSTEM FOR CARRYING OUT THE METHOD

(75) Inventor: Peter Baeuerle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 09/897,629

(22) Filed: Jul. 2, 2001

(65) Prior Publication Data

US 2002/0035428 A1 Mar. 21, 2002

(30) Foreign Application Priority Data

Jun. 30, 2000 (DE) .......................................... 100 30 987

(51) Int. Cl.⁷ .......................... G06F 19/00; G05B 24/02
(52) U.S. Cl. ........................................ 701/114; 701/115
(58) Field of Search .......................... 701/110, 114, 701/115, 102, 29, 35

(56) References Cited

U.S. PATENT DOCUMENTS 6,397,127 B1 * 5/2002 Meyers et al. ................. 701/29
2002/0142885 A1 * 10/2002 Graf et al. .................... 477/115

FOREIGN PATENT DOCUMENTS

DE             42 03 704          8/1993

* cited by examiner

*Primary Examiner*—Hieu T. Vo
(74) *Attorney, Agent, or Firm*—Kenyon & Kenyon

(57) ABSTRACT

A method of initializing a system for open/closed-loop control of the operating sequences of a motor vehicle is described. The system has a controller which is connected to a number of sensors via a data bus. The sensors have suitable means which allow a response to be transmitted staggered in time. In order to initialize the system, the controller first transmits a transmission request to sensors of the same type. The sensors of the same type transmit responses staggered in time back to the controller. During the transmission of the responses, a data field of each response is overwritten by the controller with a sensor-specific identifier and a corresponding transmission priority.

9 Claims, 6 Drawing Sheets

METHOD OF INITIALIZING A SYSTEM FOR OPEN/CLOSED-LOOP CONTROL OF THE OPERATIONAL SEQUENCES OF A MOTOR VEHICLE AND A SYSTEM FOR CARRYING OUT THE METHOD

FIELD OF THE INVENTION

The present invention relates to a method of initializing a system for open/closed-loop control of the operational sequences of a motor vehicle and to a corresponding system.

BACKGROUND INFORMATION

A method of initializing an electronic control system, in particular in a motor vehicle, is known from German Published Patent Application No. 42 03 704 A1. The electronic control system contains a primary controller and a plurality of downstream secondary controllers, each one associated with a function module. All controllers are capable of exchanging information via a data bus. In the method described for initializing the control system, the primary controller is activated to successively perform program-controlled, selective initializations of all secondary controllers. During this initialization, each function module is activated to perform a predefined action which is localized with the help of an external application diagnosis. Thereafter, the discrete location where the function module, i.e., the associated secondary controller, is used is transmitted to the primary controller.

The method described in the above-mentioned document allows an initialization of an electronic control system, in which the use location of the function modules associated with the secondary controllers is identified using software means.

Controllers are used for the open/closed-loop control of the operational sequences of a motor vehicle. Normally, at least one controller is associated with each function unit in the motor vehicle, for example, the engine control. It is, however, also possible to combine the control of a plurality of function units in one controller or to provide a plurality of controllers for complex units.

Each of the controllers is connected to a number of sensors for receiving data which will be needed for calculating the control signals. It is known that the sensors can be connected to the controller via a cable harness. This means that each data line connects exactly one sensor to the controller. Hard wiring via a cable harness allows the sensors to be uniquely assigned to the controller. However, it is disadvantageous in that the complexity of the wiring increases with an increasing number of sensors. This increases the costs and makes subsequent system modifications difficult.

In order to simplify the wiring in the vehicle, the sensors are connected to the controller via a single data bus. However, if a plurality of identical sensors are connected to a controller via one data bus, the controller must be able to uniquely identify these sensors.

For example, in a dual exhaust system, two lambda probes are needed for lambda control. These are connected to an engine controller via a CAN bus, for example. The lambda probes advantageously perform local evaluation of the measured signals, for example, by averaging. The pre-evaluated signals can then be forwarded via the CAN bus to the controller in a specific time grid such as an angle grid, for example.

It is known that sensors of different types can be used in order to permit unique assignment of the sensors. This, however, has been proved to be expensive. In order to keep the variety of parts as low as possible, the two probes used in the example described above should be identical whenever possible regarding their probe elements, software, connectors, and attachments.

If identical sensors are connected to a controller via one data bus under the above-described conditions, these sensors normally have the same identifier and the same priority for transmitting a message. As a result, unique assignment of the sensors in the controller is not possible. Therefore, the controller cannot determine from which of the sensors a received message originates and where each sensor is located. Thus, if a plurality of identical sensors are to be connected to a controller via one data bus, the sensors must be uniquely identified.

Taking as an example the lambda control in the case of a dual exhaust system, lambda probes with the same requirements may be used on both right-hand and left-hand sides of the exhaust system. Both lambda probes are then connected to the controller via the CAN bus. If the right-hand and the left-hand probes have no distinguishing features, both lambda probes are identical for the controller. As explained above, identical probes have the same identifier and the same priority for CAN transmission. This means that the controller cannot tell whether the message comes from the right-hand or the left-hand probe.

Therefore, the object of the present invention is to provide a method and a system which allow essentially identical sensors to be uniquely identified.

SUMMARY OF THE INVENTION

The method according to the present invention initializes a system for open/closed-loop control of the operational sequences of a motor vehicle. This system has a controller which is connected to a number of sensors via a data bus. The sensors are subdivided into groups with sensors of the same type in each group. This means that all the sensors in one group are identical. The controller has information about the sensor types used. If sensors of only one type are used, only one group is provided. The method is distinguished by the fact that, in order to initialize the system, a transmission request is initially transmitted to sensors of the same type. Thus, if sensors of only one type are provided, the controller only sends one transmission request to all the sensors. The sensors that receive this transmission request transmit a response to the controller staggered in time with the aid of suitable means. During the transmission of the responses staggered in time, the responses are overwritten by the controller with a sensor-specific identifier and a corresponding transmission priority.

Whenever the vehicle is started, including first start-up, a query is performed for the identity of the sensors. If identifiers with corresponding priorities have already been assigned to the sensors, all the sensors of the same type identify themselves consecutively with their identifiers. If the sensors have their original identifiers, which are the same, as is the case at the time of the first startup or after the sensors have been replaced in a repair shop, the sensor-specific identifiers are reassigned.

The controller overwriting the responses or messages from the sensors offers the advantage that the controller is aware of all the sensor-specific identifiers according to the program status and assigns them consecutively to each sensor during the responses by correspondingly overwriting the identifier (data field). Furthermore, during the transmission of the overwrite message or response, each individual sensor is aware of this transmission. This means that each sensor can assign itself the identifier overwritten by the controller and store it locally. In this manner the sensors can be uniquely identified.

The identifier is a file, for example, which contains information regarding the given sensor and characterizing it. Each sensor is assigned its own transmission priority. In this manner it can be ensured that, when a plurality of sensors transmit at the same time, the transmitted signals are received by the controller in the order of their urgency.

The sensors preferably have a random number generator as suitable means for ensuring that transmission of their responses to the controller are staggered in time. This ensures that sensors of the same type respond to a transmitted message of the controller at different times. After receiving the transmitted message, the corresponding random number generator of each sensor that has been addressed is started. It triggers the transmission of the response. The responses are thus sent staggered in time and received by the controller at different times. With this measure, feedback from the sensors is staggered in time and can be implemented in a simpler and more reliable manner.

It is advantageous if the results of the overwrite with the sensor-specific identifier and the corresponding transmission priority are stored in a non-volatile memory. In this manner, after restart of the vehicle, the complete process of assigning the identifiers to the respective sensors does not need to be carried out again.

After the sensors have been identified, they can be assigned according to their respective locations. This can be accomplished by comparing the signals delivered by the sensors with test signals. If the measured signal is identical to the test signal, the sensor can be assigned to a certain location. The test signal is transmitted consecutively to all locations. Thus all sensors can be assigned to their respective locations.

A CAN bus is preferably used as a data bus. The CAN bus has been successfully used in motor vehicles in particular.

The system according to the present invention for open/closed-loop control of a motor vehicle has a controller which is connected to a number of sensors via a data bus. Sensors of the same type or different sensors can be used. The sensors are divided into groups each containing the same type of sensors. The system is distinguished by the fact that the sensors have suitable means to ensure feedback from the sensors is staggered in time.

DETAILED DESCRIPTION

Figure 1:
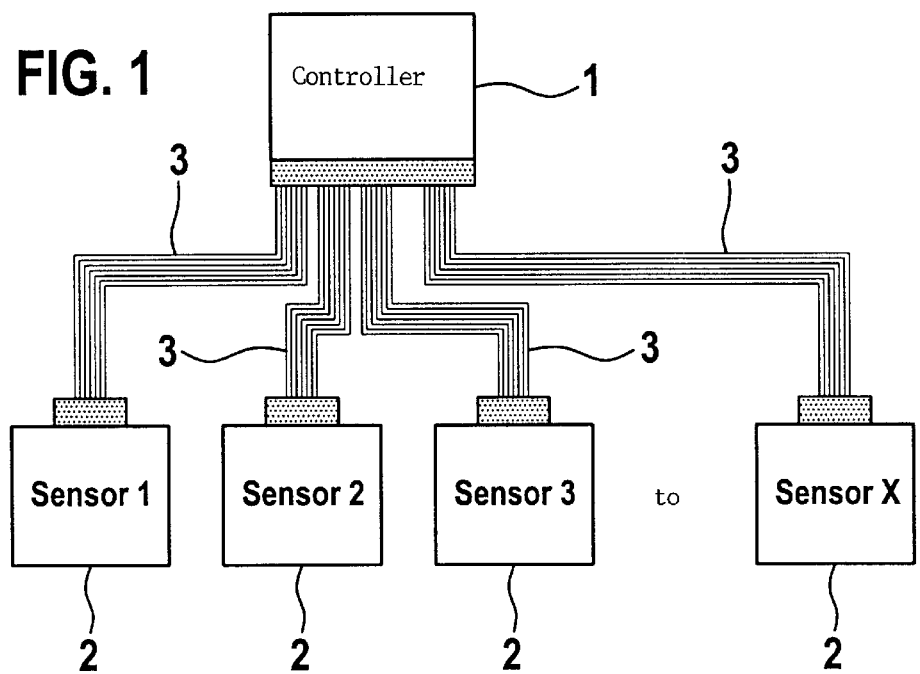
FIG. 1 shows a conventional connection of sensors to a controller.

FIG. 1 shows a controller 1 and four sensors 2 which are each connected to controller 1 via data lines 3. The drawing shows the conventional connection of a plurality of sensors 2 of the same type to controller 1. Hard wiring via the four data lines 3, which form a cable harness, allows sensors 2 to be uniquely assigned. The disadvantage is that with an increasing number of sensors 2 the wiring complexity increases considerably.

Figure 2:
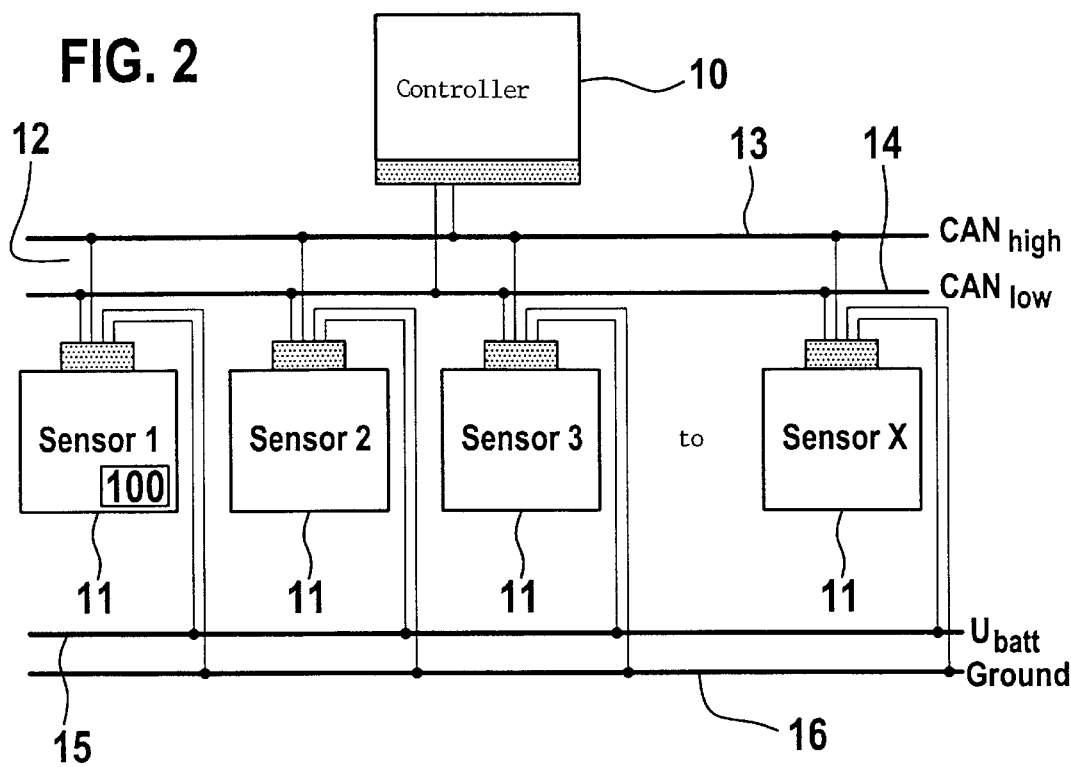
FIG. 2 shows a connection of sensors to a controller via a data bus.

FIG. 2 shows a controllers 10 and four sensors 11. The sensors are connected to controller 10 via a CAN bus 12. The complexity of the wiring to the controller is reduced to one line $CAN_{high}$ 13 and one line $CAN_{low}$ 14. Furthermore, the sensors are connected to a supply voltage 15 ($U_{batt}$) and to ground potential 16 (Ground).

In order not to overload CAN bus 12 regarding the data transmission, it is recommended that local evaluation be carried out at the individual sensors using an appropriate additional electronic system. This additional electronic system may perform averaging, calculate standard deviation, or convert the sensor signals into physical quantities, for example. The pre-evaluated sensor signals can then be transmitted at greater time intervals than would be required for the transmission of each individual measured value.

Figure 3:
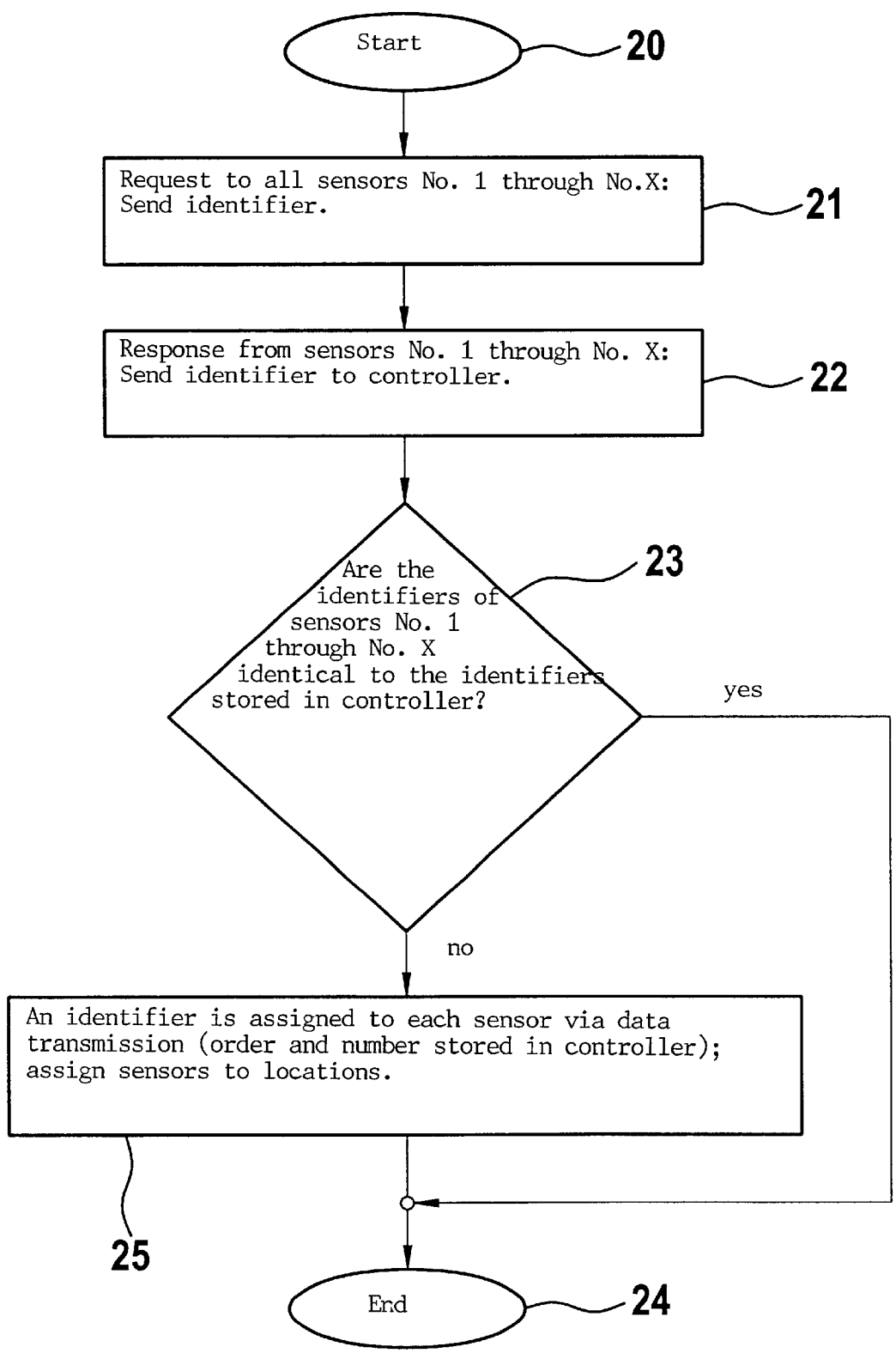
FIG. 3 shows a sequence of a preferred embodiment of the method according to the present invention in a diagram.

In the case where the sensors are at least partially identical for the controller, identification of the sensors must be performed. This is initially explained with reference to FIG. 3. It is assumed here that all sensors are identical. Of course, it is also possible to consider groups of identical sensors within the totality of sensors.

The method starts with step 20. In step 21 a query is performed to identify the sensors. This takes place when the vehicle is started, in particular also when it is started for the first time. To do so, in step 21 the controller sends a request for all sensors of the same type to identify themselves with their identifiers. If the sensors have been assigned their own "individual" identifiers with the respective priorities, all sensors identify themselves with their identifiers in the order of their priorities. The responses are received by the controller in step 22. If the identifiers of the responses of the sensors agree with the identifiers stored in the controller (step 23) the "sensor identification" mode is completed with "yes." Initialization then ends with step 24.

If all sensors or even individual sensors have their original, (i.e., not yet individualized) identifiers, which means the same identifiers, which may be the case at the time of first use or after sensors have been replaced in a repair shop, the sensor-specific identifiers are reassigned in step 25 and, if necessary, the sensors are assigned to their locations. This step 25 is explained in more detail with reference to FIGS. 4 to 7.

Figure 4:
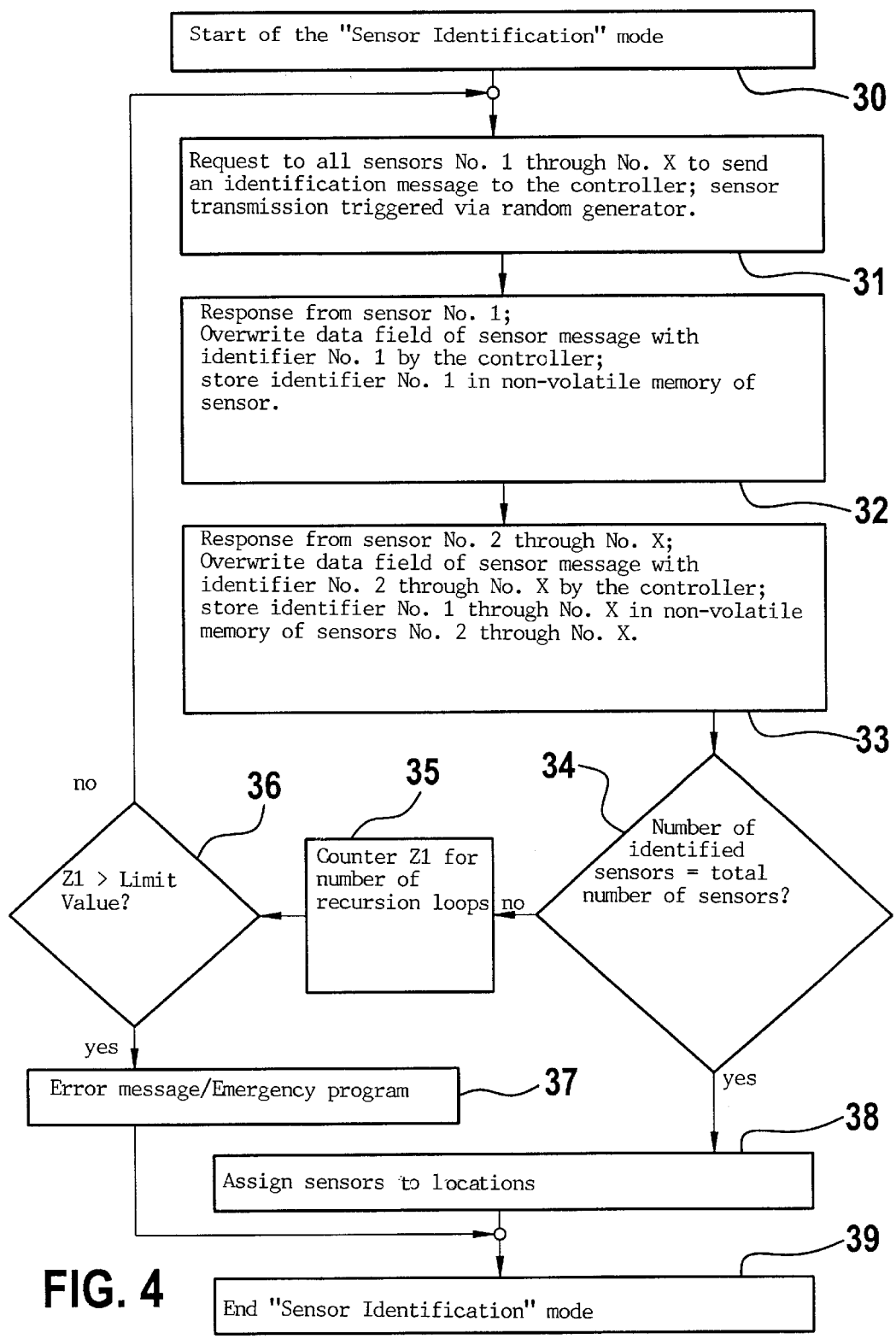
FIG. 4 shows a sequence of a preferred embodiment of the identification of sensors according to the present invention in a diagram.

FIG. 4 shows the identification sequence of the sensors and the assignment of the sensors to their locations.

The "sensor identification" mode is first started in step 30. In step 31 the controller transmits a request to all sensors of the same type, for example, to the lambda probes, to identify themselves with their identifiers. In the case illustrated, the method is explained for two identical sensors 1, 2. Since these sensors have the same identifier, they cannot be differentiated by the controller. It is important that the sensors should not identify themselves at the same time—a response could originate from more than one sensor—but rather that they respond staggered in time. In order to guarantee this, a random number generator is started after each individual sensor has received the transmission request;

this random number generator triggers the retransmission of the messages, i.e., data, from the sensors to the controller. Such a random number generator is schematically shown in FIG. 2 for sensor 1 and is labeled 100.

In step 32, the controller receives the response from the first sensor and overwrites a first data field, for example, of the sensor message, i.e., the response containing an identifier and a priority. This data, i.e., the sensor messages/responses thus modified is stored in a non-volatile memory of the sensor. Typical formats of sensor messages, i.e., responses, are further explained with reference to FIG. 7.

In step 33 following step 32, the controller receives the response from the second sensor. A data field of the response is again overwritten by the controller with an identifier and a priority. The identifier and the priority are stored in a non-volatile memory of the sensor.

According to steps 32 and 33, all sensors are reassigned an identifier and a priority. The number of requests by the controller is equal to the number of different sensor types. The identification of the sensors should be preferably completed after the elapse of a predefined time period. If there are sensor-specific identifiers that are stored in the controller program but are not yet assigned to any sensor, this may be caused by the fact that two or more sensors responded at the same time or one or more sensors are missing or are defective. This is checked in step 34.

In such a case, re-identification of the sensors is repeated (step 35). The number Z1 of recursive loops run through is counted by a counter Z1. If a run is repeated, already identified sensors may keep their identifiers, while not yet assigned sensors receive new identifiers. For the sake of simplicity, both the counter and the limit value assigned to it are labeled Z1.

If, after Z1 repetitions (limit value Z1), still no unique assignment of the identifiers to the sensors is possible (step 36, comparison of the number of repetitions performed with limit value Z1), an emergency program is started and/or an error message is output (step 37).

If the sensor-specific identification of the sensors has been successfully completed, the identified sensors can be assigned to their respective locations. This is accomplished in step 38. The "sensor identification" mode is terminated with step 39.

Figure 5:
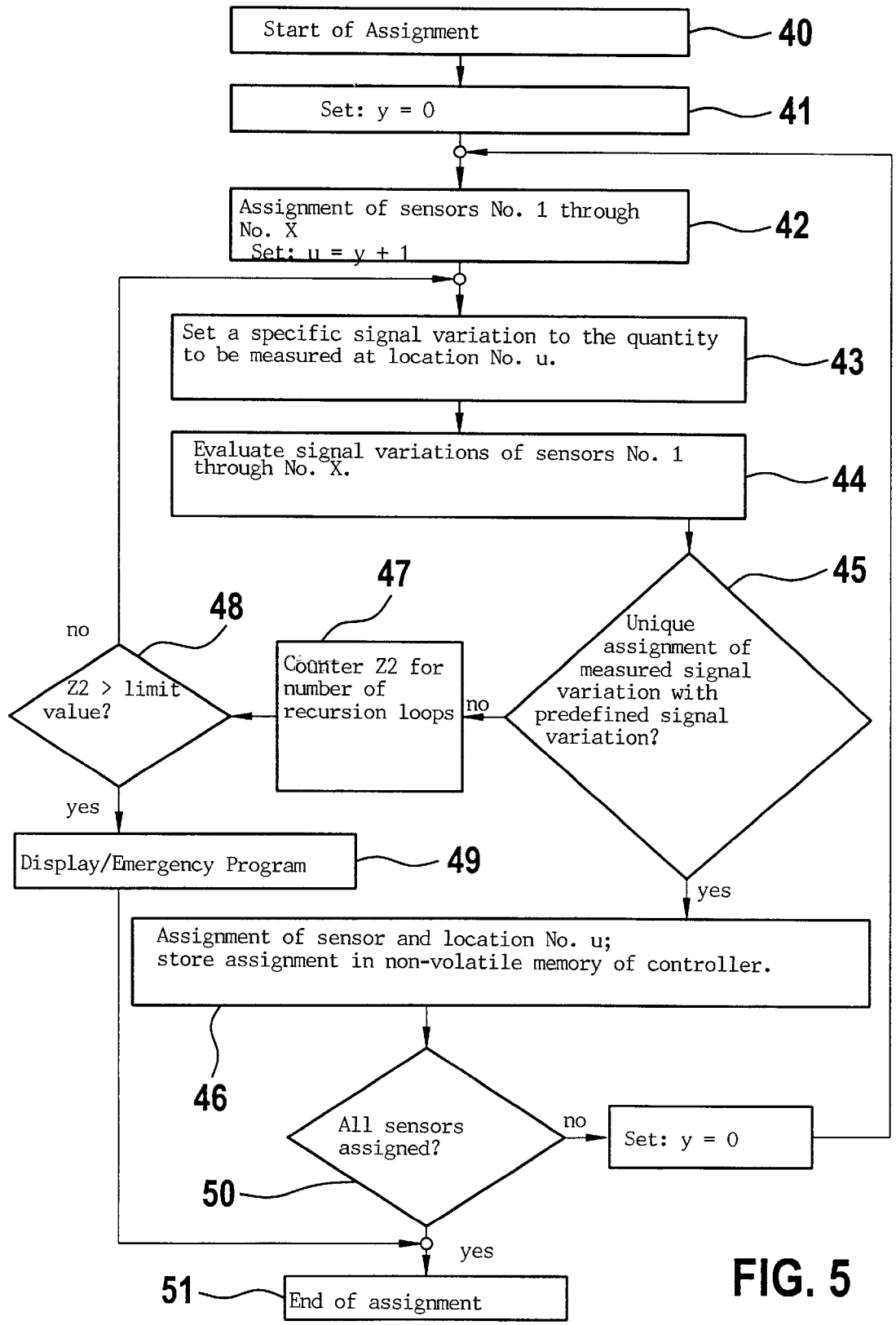
FIG. 5 shows the assignment of the identified sensors to their respective locations.

FIG. 5 shows the assignment of the identified sensors to their respective locations. Variable u here corresponds to the number of sensors, i.e., locations. Variable u is assigned to the locations. A variable y is assigned to the sensors.

Sensor assignment begins with step 40. In step 41 variable y is set to 0.

In step 42 the sensors are assigned to variables y. Furthermore, u is set to y+1. In step 43, a certain signal variation of the quantity to be measured is set at location u. A test signal ("predefined signal variation") is superimposed on and compared with the controlled variation of the quantity to be measured, for example, lambda or pressure. In step 44, the signal variations of the sensors are analyzed. In step 45, the measured signal variations are compared to the test signal. The variation of a corresponding test signal is superimposed on the quantity to be measured at each location and the measured sensors signal is compared to this test signal. After successful determination of the sensor locations, in step 46 the assignment of the sensor-specific identifiers to the respective locations is stored in a non-volatile memory of the controller. This reassignment is then no longer necessary when the vehicle is started again.

If the measured and predefined signal variation cannot be uniquely assigned to one another, the superimposition is performed again. The number of recursion loops run through is counted by counter Z2 in step 47. If the number of repetitions exceeds a certain limit value Z2 (step 48), an emergency program is started and/or an error message is output (step 49). Also in this case, for the sake of simplicity, Z2 is used for both the reference symbol of the counter and its respective limit value.

After the measured and predefined signal variations have been uniquely assigned to one another in step 45, the sensors are assigned to their locations in step 46. This assignment is stored by the controller in a non-volatile memory of the controller.

After step 46, a check is performed in step 50 to determine whether all the sensors could be assigned to their respective locations. If this is not the case, y is set to equal u, and the assignment of the sensors restarts with step 42. In the case where all sensors could be assigned to their respective locations, the assignment is terminated in step 51.

Figure 6:
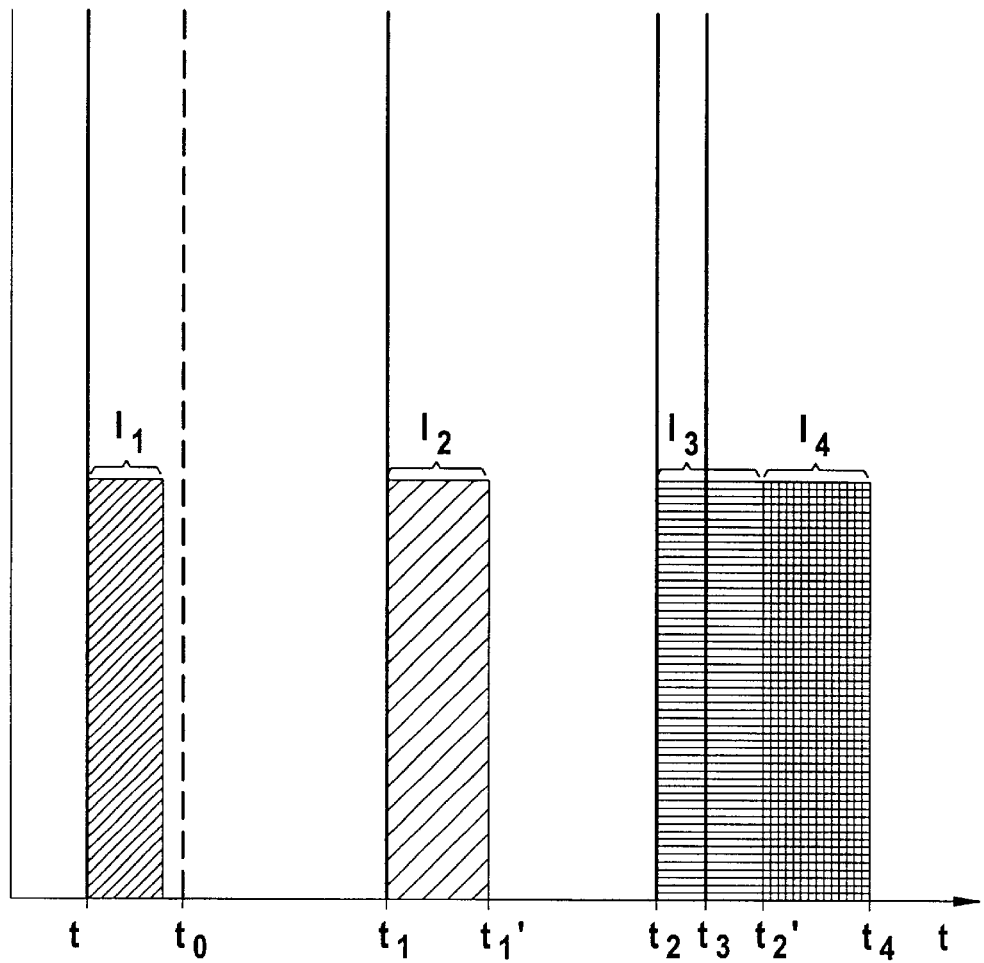
FIG. 6 shows the sequence of transmitting messages for the identification of the sensors over time.

The variation over time of the transmitted data, i.e., messages for the identification of the individual sensors according to the present invention is further explained with reference to FIG. 6.

At time $t_{Anf}$, the request for the transmission of an identification message is transmitted. The transmission takes place in interval $I_1$. After the request message has been transmitted, a random number generator is started at all sensors at time $t_0$. The random number generator of sensor 1 triggers the transmission of the identification message by sensor 1 at time $t_1$. This message is transmitted within an interval $I_2$ and is terminated at time $t_1'$. At time $t_2$, the transmission of the message of the second sensor is started. The transmission of the message of the third sensor is triggered at time $t_3$. The transmission of the message of the second sensor takes place in interval $I_3$ and is terminated at a time $t_2'$. Since at this time $t_2'$ the second sensor is still transmitting its message, the transmission of the message of the third sensor cannot start until the message of the second sensor is completely transmitted, i.e., at time $t_2'$. The transmission of the message of the third sensor takes place in interval $I_4$ and is terminated at time $t_4$.

The staggering of the transmission of sensor messages as illustrated is achieved with the help of the random number generators which output randomly selected time intervals after which data transmission can take place.

Figure 7:
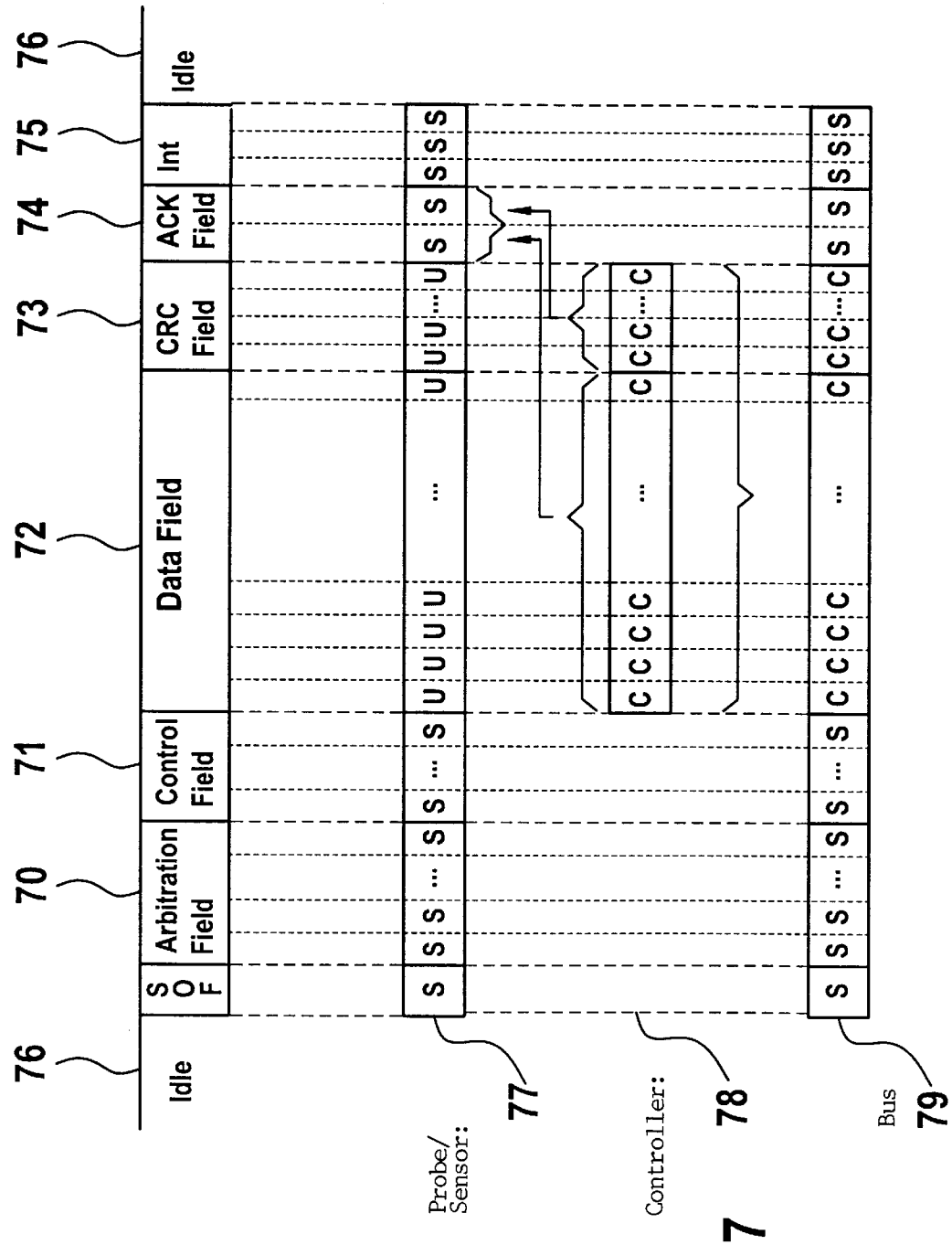
FIG. 7 shows a typical data format, i.e., message format for a CAN bus.

FIG. 7 shows as an example a possible message format when a CAN bus is used.

The identifier, for example for the species "lambda probe," is stored in an "arbitration field" 70. 71 represents the "control field." A predefined number of data bytes which however are not yet written by the sensor is reserved in "data field" 72. The voltage can be at low or high or at any desired level; any desired voltage and current variation is possible.

A "CRC field" is labeled 73; an "ACK field" is labeled 74; an "Int" field is labeled 75 and an "idle" field is labeled 76. During the message transmission, data field 72 is overwritten by the controller with the sensor-specific identifier and the priority, in particular including the required information for frame definition (CRC check). In the case of correct reception, the sensor acknowledges the receipt of the data with a positive Acknowledge in ACK field 74.

A line 77 represents the data transmitted by the sensor; a line 78 represents the data transmitted by the controller. A line 79 points to the data on the bus. The totality of all transmitted data which can be read by all components connected to the bus is represented in a line 79.

What is claimed is:

1. A system for performing an open/closed-loop control of an operating sequence of a motor vehicle that includes a controller connected to a plurality of sensors via a data bus, the sensors being subdivided into sensors of the same type, the system comprising:

an arrangement located in each of the plurality of sensors for, when a transmission request is sent from the controller, allowing each sensor to transmit a response staggered in time to the controller.

2. The system according to claim 1, wherein:

the arrangement includes a random generator.

3. The system according to claim 1, wherein:

the data bus includes a CAN bus.

4. A method of initializing a system for an open/closed-loop control of an operating sequence of a motor vehicle that includes a controller connected to a plurality of sensors via a data bus, the method comprising the steps of:

subdividing the sensors into sensors of the same type;

causing the controller to transmit a transmission request to the sensors of the same type;

causing the sensors of the same type to transmit a response to the controller that is staggered in time by an operation of a staggering arrangement; and during the transmission of the response, causing the controller to overwrite a data field of each response of the sensors with a sensor-specific identifier and a corresponding transmission priority.

5. The method according to claim 4, wherein:

each sensor includes the staggering arrangement, and the staggering arrangement includes a random generator.

6. The method according to claim 4, further comprising the step of:

storing in a non-volatile memory a result of the overwriting of each response with the sensor-specific identifier and the corresponding transmission priority.

7. The method according to claim 4, further comprising the steps of:

identifying the plurality of sensors; and after the identifying step, assigning the plurality of sensors to respective locations.

8. The method according to claim 7, wherein the step of assigning the plurality of sensors includes the step of:

comparing signals delivered by the plurality of sensors with test signals.

9. The method according to claim 4, wherein:

the data bus includes a CAN bus.

* * * * *